US006797086B2

(12) United States Patent
Boleda et al.

(10) Patent No.: US 6,797,086 B2
(45) Date of Patent: Sep. 28, 2004

(54) ANTICIPATIVE TEMPERATURE CONTROL FOR THERMAL TRANSFER OVERCOATING

(75) Inventors: Miquel Boleda, San Diego, CA (US); David J. Arcaro, Boise, ID (US); John Havard, Seattle, WA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 10/219,645

(22) Filed: Aug. 15, 2002

(65) Prior Publication Data

US 2004/0031557 A1 Feb. 19, 2004

(51) Int. Cl.[7] ......................... B32B 31/00; B32B 31/20; B44C 1/17; B44C 3/02

(52) U.S. Cl. ...................... 156/64; 156/230; 156/272.2; 156/288; 427/8; 427/457

(58) Field of Search ................................ 156/230, 233, 156/234, 238, 240, 247, 277, 289, 64, 272.2, 288; 427/146, 147, 148, 457, 8

(56) References Cited

U.S. PATENT DOCUMENTS 4,102,730 A 7/1978 Staats
4,311,549 A * 1/1982 Vercillo .................. 156/308.2
4,416,719 A 11/1983 Horiuchi
4,815,872 A 3/1989 Nagashima
5,217,561 A 6/1993 Ueda et al.
5,220,343 A 6/1993 Takanashi et al.
5,232,538 A 8/1993 Liu
5,411,825 A 5/1995 Tam
5,520,772 A 5/1996 Levitan et al.
5,555,011 A 9/1996 Tang et al.
5,810,965 A 9/1998 Fwu
6,009,925 A * 1/2000 Hall et al. .................. 156/358
6,030,474 A * 2/2000 Isono et al. ................. 156/358
6,264,774 B1 7/2001 Lenz et al.

FOREIGN PATENT DOCUMENTS

EP 1177913 2/2002
EP 1184197 3/2002

OTHER PUBLICATIONS

Published patent application Ser. No. 09/880544; Jun. 12, 2001; Apparatus For Binding Sheet Media; Boss, R.
Published patent application Ser. No. 09/951522; Sep. 14, 2001; System for Manufacturing Bonded Sheet Material; Ishibuchi et al.

* cited by examiner

*Primary Examiner*—J. A. Lorengo

(57) ABSTRACT

Method and apparatus for thermal transfer overcoat technology. Throughput conditions are anticipated. Multi-stage preheating of the fuser is performed such that active heating during thermal transfer overcoat is eliminated. Thermal waves create an accumulated fuser heat that is a sufficient energy to maintain a substantially constant fuser temperature needed for one whole thermal transfer overcoat cycle.

22 Claims, 3 Drawing Sheets

ANTICIPATIVE TEMPERATURE CONTROL FOR THERMAL TRANSFER OVERCOATING

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND

1. Tehnology Field

The present invention relates generally to thermal transfer overcoat ("TTO") technology.

2. Description of Related Art

In thermal transfer overcoat technology, a thin film is adhered to a document to provide durability and a glossy finish. A generic TTO apparatus 100 is illustrated by FIG. 1 (Prior Art). An automatic document feeder ("ADF") 101 as would be known in the art feeds a pre-printed document (represented by the so-labeled horizontal line) to a nip between a pressure roller 103 and a heat roller 105. An overcoat film 107 from a film supply reel 109 is threaded through the same nip. The film 107 is generally a thermally-transferable adhesive laminate material, activated by the heat roller 105, to form a clear overcoat of the printed surface of the document. After passing through the nip, a peel bar device 111 downstream of the nip separates a backing of the film 107 away from the now overcoated document 113. A film take-up reel 115 receives the film backing material.

One of the most delicate parameters to control in thermal transfer overcoat technology is the film and media interface temperature in the nip. To properly perform an overcoating operation, the adhesive coating needs to melt so that it fluidically fills the pores in the document medium, forming the overcoat finish on the final overcoated document product. Moreover, for acceptable throughput, e.g., three pages per minute ("ppm"), the process must take place relatively quickly. Moreover, when the document being overcoated is mated to the film in the nip, a relative large heat sink develops. Commonly, temperature is monitored during the thermal transfer overcoating operation and processes are reactively controlled, namely by adding significant heat when a lowest acceptable temperature is sensed. This approach causes large temperature oscillations. It also generally requires a relatively powerful and fast-acting heat source. Generally, a reactive system must employ a more expensive product architecture, e.g., providing additional heating elements, sensors, and controls, to minimize thermal mass. Otherwise it requires a steady-state, continuous operation to achieve stability.

BRIEF SUMMARY OF THE INVENTION

The present invention provides for methods and apparatus for performing an overcoat operation within a specified temperature range for optimizing output quality and throughput by anticipating overcoat operation process events.

The foregoing summary is not intended to be an inclusive list of all the aspects, objects, advantages and features nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

Like reference designations represent like features throughout the drawings. The drawings referred to in this specification should be understood as not being drawn to scale except if specifically annotated.

DETAILED DESCRIPTION

Figure 2:
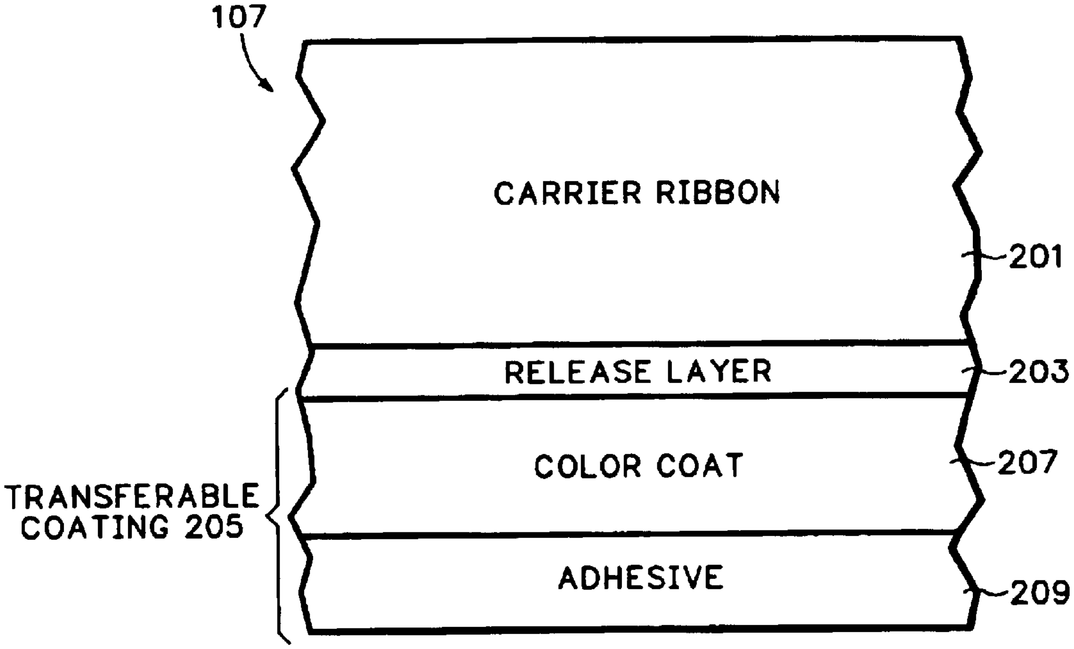
FIG. 2 is a schematic illustration in an elevation view of an overcoat film section according to an exemplary embodiment of the present invention.

Turning now also to FIG. 2, the film 107 has a backing, or "carrier ribbon," 201, e.g., a polyester material (PET). This backing 201 ends up on the take-up reel 115 downstream of the nip after peeling from the document 113 by the peel bar 111. Subjacent the carrier ribbon 201 is a release layer 203 (sometimes referred to in the art as the "separator;" an exemplary material is a carnuba wax. Subjacent the release layer 203 is a transferable coating 205. The transferable coating 205 comprises a laminate of a color coat 207 and an adhesive 209. The color coat is, for example, a clear resin that provides gloss, permanence, and handling durability for the overcoated document 113. The adhesive coat 209 is, for example, acrylic, which adheres the color coat to the medium during the thermal transfer overcoating process in the nip. Preferably, the adhesive coat 209 has a melting temperature around ninety degrees Centigrade.

The application of the overcoat 207, 209 to the document involves controlling a number of physical variables in the nip between the pressure roller 103 and the heat roller 105 toward the objective of melting the release layer 203 and the adhesive coat 209 of the film 107 to cause transference of the overcoat 207, 209 to the medium while releasing the carrier 201 for removal by the peel bar 111 and take-up reel 115.

Figure 1:
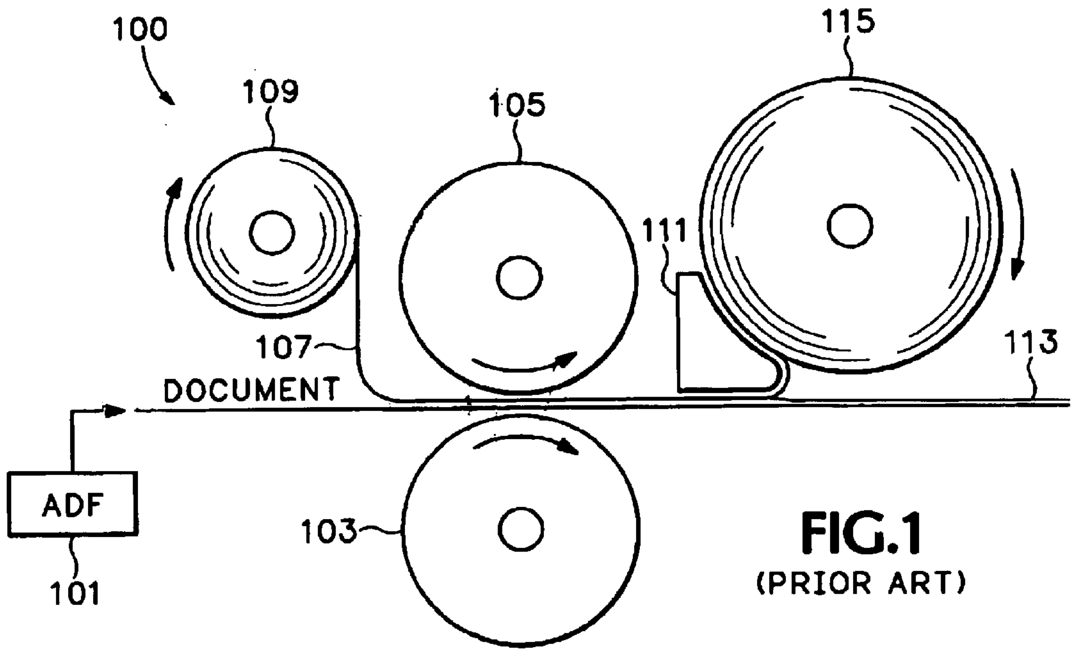
FIG.1 (PRIOR ART)
FIG. 1 (Prior Art) is a schematic illustration in an elevation view depicting a TTO apparatus and process.
Figure 3:
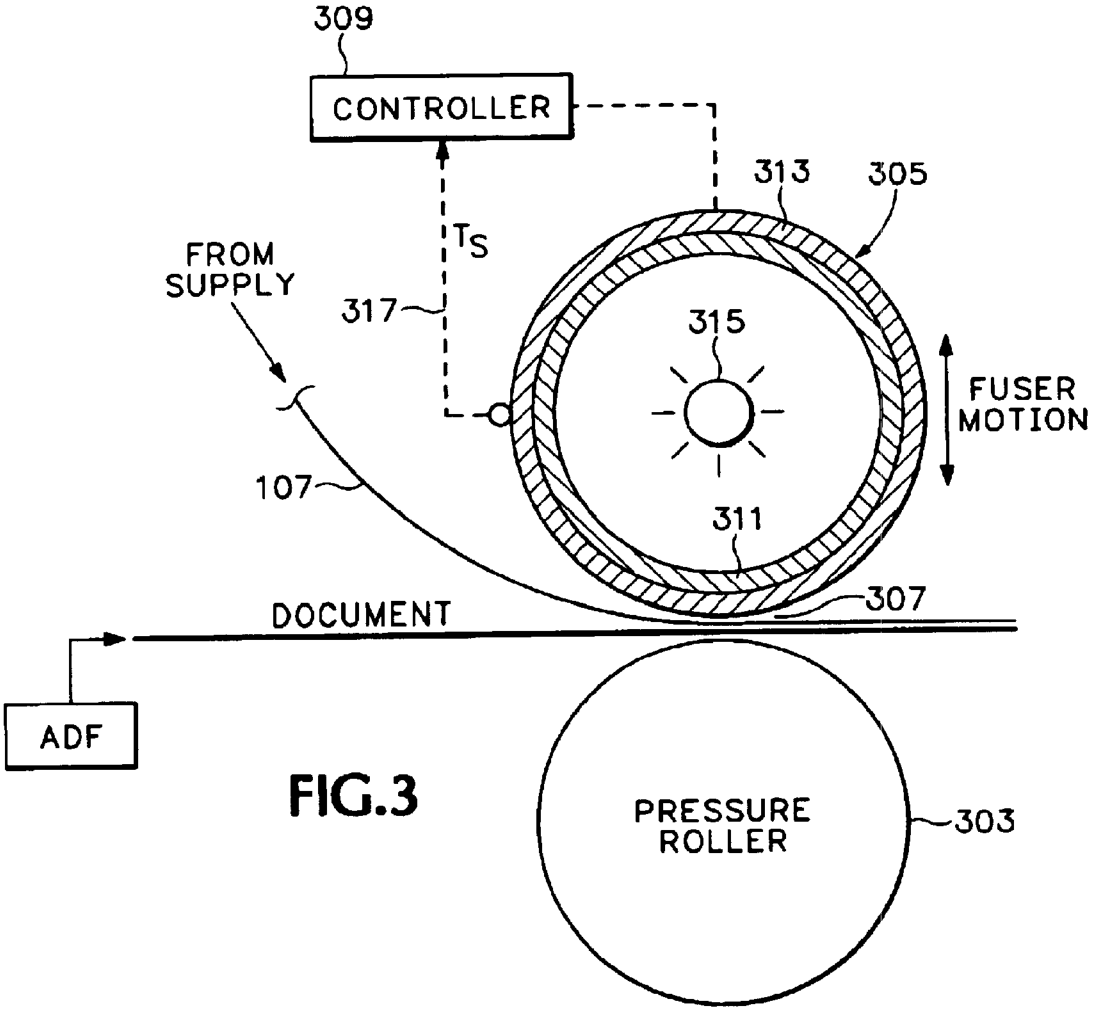
FIG. 3 is a schematic illustration in an elevation view of a pressure roller and heater roller construction according to an exemplary embodiment of the present invention.

According to an embodiment of the present invention, FIG. 3 is a schematic illustration in elevation view of a pressure roller 303 (analogous to FIG. 1, element 103) and a heating roller 305 (analogous to FIG. 1, element 105), in contact at a nip 307. As represented by the arrow labeled "Fuser Motion," the heating roller 305 is a movable assembly, selectively engagable with the pressure roller 303 to form the nip 307 on-demand. A controller subsystem 309, such as a microprocessor or application specific integrated circuit ("ASIC") printed circuit board, is programmable to control thermal transfer overcoat operations.

The pressure roller 303 is formed of, or at least has an outer surface of, a compliant material, e.g., silicone rubber. This compliant material has a relatively high temperature resistance, namely significantly greater than the thermal transfer overcoat operation fusing temperature reached in the nip 307.

The heating roller 305 is an assembly comprising cylinder 311 having a wall formed of a metal, e.g., aluminum, or other material having a capacity for rapidly transferring heat, e.g., aluminum, wrapped with an outer tire, sometimes referred to as a "skin," 313 also of a relatively high temperature resistance, compliant material, e.g., silicone rubber. Within the cylinder 311 is a heating element 315, e.g., a halogen bulb, having ON and OFF states determined by the controller 309 during operations. Note that the heating element 315 may also have a continuous range of power and temperature settings or be controlled through known manner pulse width modulation (PWM) techniques. The heating roller 305 assembly is also referred to hereinafter as the "fuser" 305. A temperature sensor 317, e.g., a thermistor, keeps track of the outer skin 313 temperature "T," for the controller 309.

Figure 4:
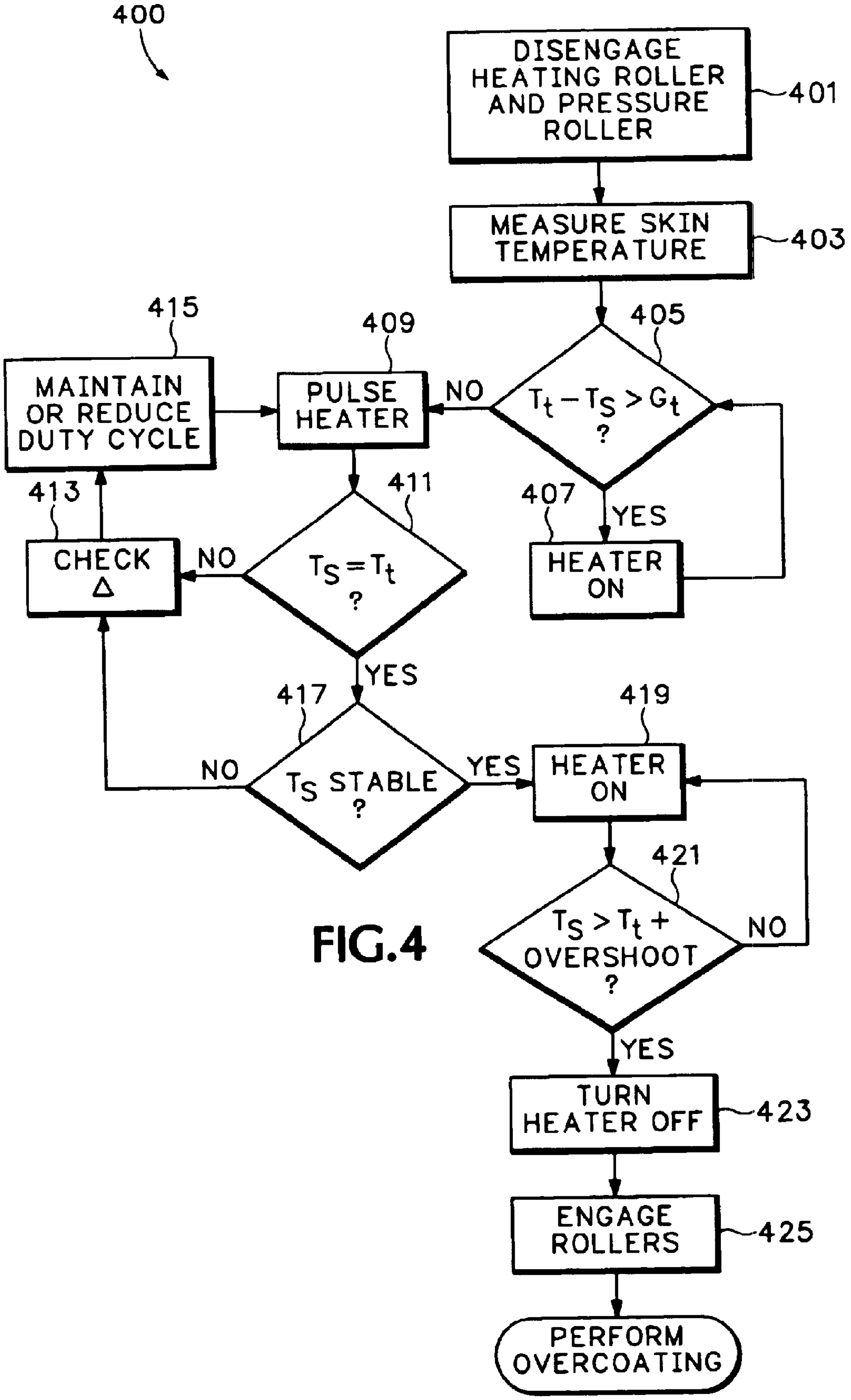
FIG. 4 is a flowchart illustrating the process according to an exemplary embodiment of the present invention.

In an exemplary operation, as depicted by FIG. 4 (referring simultaneously to FIGS. 2 and 3 may aid understanding), anticipative temperature control is employed. A three stage warm-up, or preheating cycle, of the fuser 305 is employed, anticipating both the necessary temperature for activating the adhesive 209 and the release layer 203 and the nip heat sink conditions which cause a temperature drop when the thermal transfer overcoat takes place. The first two stages of the warm-up are to bring the fuser 305 up to the required baseline fusing temperature quickly without excessive overshoot, thereby reducing wait time for the user while preventing overheating of the apparatus. The third stage anticipates the nip heat sink conditions.

The fusing temperature in the nip must not be too high, otherwise the carrier ribbon 201 (FIG. 2) expands too much, creating wrinkles on the overcoated document 113. A smoke emission hazard may also be created if the temperature is allowed to get too high. On the other hand, the fusing temperature must be high enough to cause a heat transfer rate that is adequate for the required release temperature, the overcoating process in view of the throughput, namely the velocity of the document through the nip 307, and characteristics of the adhesion process between the film 107 and document medium.

Accordingly, the fuser 305 is provided a three-stage warm-up cycle that anticipates a temperature drop when overcoating takes place in the nip 307.

The three-stage warm-up cycle is conducted without engaging the rollers 303, 305; that is, the fuser 305 is in a raised (see arrow "Fuser Motion") position, not yet in contact with the pressure roller 303, advantageously preventing any damage to the release layer 203, FIG. 2; see also FIG. 4, 401. Note that it has been found that this methodology provides a faster warming time in comparison to a method where the rollers 103, 105 are permanently engaged. While another trigger may be selected, the first stage may be trigger when the ADF 101 begins to feed a printed document but before the document leading edge reaches the nip 307. Skin temperature, "Ts," is determined from the temperature sensor 317; see FIG. 4, 403. Based on the specific implementation properties of the film 107 and the type of media being fed by the ADF 101 to be overcoated, there will be a known, or preferred, fusing temperature, "Tf," for optimal overcoating. A first preheating target temperature is associated with fusing temperature. The relationship will be implementation specific and can be empirically determined.

A temperature gap, "Gt," between the skin temperature and the first preheating target temperature is assigned a predetermined value such that while the difference between the current skin temperature and the target temperature is greater than the predetermined temperature gap, the heater 315 is ON continuously; see FIG. 4, 405, YES-path, 407. For example, this constant heating process goes on while the skin temperature of the heating roller is more than about seventy percent below the first preheating target temperature {wherein seventy percent was empirically determined for a specific implementation and may vary depending on, for example, fuser roller construction and materials}.

When the temperature gap reaches the predetermined value, and thus begins to go beyond the predetermined value, the heater 315 is put into a pulsed mode, slowing down the incremental rate gain of change of the skin temperature; see FIG. 4, 405, NO-path, 409. This comprises the second stage of the warm-up cycle. The pulsed, ON-OFF, duty cycle of the heater 315 is reduced as the skin temperature approaches the first preheating target temperature; see FIG. 4, 411, NO-path, 413, 415. The second stage is complete when the skin temperature reaches the target value and maintains the target value for a predetermined period of time, "Tc," e.g., four seconds. The selected predetermined period of time when the skin temperature is at least at the target value will be dependent upon the media-to-film fusing characteristics and media throughput parameters of the specific implementation. The key is to achieve a stable skin temperature; see FIG. 4, 417, NO-path, 413. Note that a lowering gradient heat rather than pulse ON-OFF heat may be alternatively implemented, but it is believed that better results are achieved with a pulsed implementation.

Once the stable skin temperature value is achieved, FIG. 4, YES-path, the heater 315 element is again turned ON continuously; see FIG. 4, 419. This is the third stage of the warm-up cycle. The heater 315 is kept ON until the skin temperature rises and achieves an overshoot of the first preheating target temperature by a predetermined amount, e.g., five degrees; see FIG. 4, 421, NO-path. Again the specific overshoot amount will be dependent upon the media-to-film fusing characteristics and throughput parameters of the specific implementation. It has been found that this overheating during stage three creates heat waves inside the heater roller 305 that slowly reach the tire 313 outer surface during the overcoating process. This will maintain the tire 313 outer surface within an acceptable range of the optimal fusing temperature, "Tf." Once the first preheating target temperature overshoot temperature is achieved, the heater 315 is turned OFF; see FIG. 4, 423.

The rollers 303, 305 are engaged by lowering the fuser assembly to form the nip 307 with the pressure roller 303; see FIG. 3, arrow labeled "Fuser Motion," and FIG. 4, 425.

The document lead edge from the ADF 101 and the film 107 from the supply reel 109 now meet in the nip 307. The heat waves create an accumulated heat that is a sufficient energy to maintain a substantially constant skin temperature, namely, a range of fusing temperature—"Tf±Δ"—needed for the whole overcoating operation, e.g., approximately 165° C. +5, −10 degrees. In this embodiment, the heater 315 remains OFF throughout the overcoating operation. However, note that in any specific embodiment the fuser roller outer skin thickness may be a determinative or at least a factor along with paper length, throughput or the like parameters as will be recognized by those skilled in the art; loss in heat capacity may require an ON cycle, most likely at the initiation of the actual overcoating operation.

In another exemplary embodiment, the heater can be activated for a time period during the overcoat stage, and returned to a controlled standby temperature thereafter Thus, with an implementation of the described exemplary embodiments present invention, temperature uniformity throughout the thermal transfer overcoat process is provided by anticipating the needs of the overcoating operation parameters. In other words, for a specific implementation where characteristics of the medium are known, the characteristics of the laminating film are known, and the throughput velocity through the nip between a heater roller and pressure roller is known, an anticipative three stage warm-up cycle of the heater roller can be implemented to create a substantially constant heat exchange in the nip during the overcoating operation with the heater element off.

The foregoing description of exemplary and preferred embodiments has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable or combinable with other steps in order to achieve the same result. Each embodiment was chosen and described in order to best explain the principles of the invention and its best mode practical application, thereby to enable others skilled in the art to understand the invention for various embodiments and with various modifications as are suited to the particular use or implementation contemplated. While this disclosure is made with respect to the current state-of-the-art, it must also be recognized that there may be advancements to the state-of-the-art; therefore, future adaptations may take into consideration and apply such advancements. Therefore, no limitation on the scope of the invention as claimed is intended by the foregoing description which may have included tolerances, feature dimensions, specific operating conditions, engineering specifications, and the like, which may vary between implementations and adaptations or with changes to the state-of-the-art by the time of implementation, and none should be implied therefrom. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . . "

What is claimed is:

1. A method for joining a document to a film, the method comprising:

actuating a heat source to heat a first surface opposite a second surface to an overshoot temperature greater than a target temperature at which the film may be joined to the document;

unactuating the heat source once the overshoot temperature at the first surface is obtained; and moving the document and the film between the first surface and the second surface after the heat source has been unactuated.

2. The method of claim 1 including moving one of the first surface and the second surface towards one another after the heat source has been unactuated.

3. The method of claim 2, wherein at least one of the first surface and the second surface is provided by at least one roller.

4. The method of claim 1 including a roller providing one of the first surface and the second surface, the roller being configured to rotate about an axis, wherein the method further includes moving the roller in a direction perpendicular to the axis towards the other of the first surface and the second surface.

5. The method of claim 1, wherein the heat source is unactuated an entire time while the document and the film are being moved between the first surface and the second surface.

6. The method of claim 1, wherein the heat source is spaced from the first surface by a distance, wherein heat waves from the heat source traveling through the distance continue to heat the first surface after the heat source is unactuated and during movement of the document and the film between the first surface and the second surface.

7. A method for heating a thermal transfer overcoat heating roller prior to engaging the heating roller with a pressure roller and performing a thermal trartsfer overcoat, the method comprising:

monitoring skin temperature of the heating roller;

rapidly heating the interior of the heating roller until a first target skin temperature is achieved;

slowing incremental rate gain of change of the skin temperature until a second skin temperature is stabilized at temperature greater than said first target skin temperature;

rapidly heating the interior of the heating roller and overshooting said second target skin temperature until a predetermined third skin temperature higher than said second target skin temperature is achieved; and stopping heating of the interior of the heating roller before completion of the thermal transfer overcoat such that temperature for an entire thermal transfer overcoat operation is maintained.

8. The method as set forth in claim 7 wherein said stopping further provides that a temperature overshoot does not occur.

9. A method for heating a thermal transfer overcoat heating roller prior to engaging the heating roller with a pressure roller and performing a thermal transfer overcoat, the method comprising:

monitoring skin temperature of the heating roller;

rapidly heating the interior of the heating roller until a first target skin temperature is achieved;

slowing incremental rate gain of change of the skin temperature until a second skin temperature is stabilized at temperature greater than said first target skin temperature;

rapidly heating the interior of the heating roller and overshooting said second target skin temperature until a predetermined third skin temperature higher than said second target skin temperature is achieved; and stopping heating of the interior of the heating roller for said engaging the heating roller with a pressure roller and performing a thermal transfer overcoat.

10. The method as set forth in claim 9, wherein said heating roller comprises a cylindrical wall, said rapidly heating the interior of the heating roller and overshooting said second target skin temperature further comprises:

creating waves of heat in said interior and in said wall such that a substantially constant fusing temperature is maintained in a nip formed between said heating roller and said pressure roller during said thermal transfer overcoat.

11. The method as set forth in claim 10 wherein said waves of heat create an accumulated heat that is a sufficient energy to maintain a substantially constant skin temperature needed for the whole thermal transfer overcoat.

12. A method for effecting a thermal transfer overcoat operation temperature, the method comprising:

using an internal heat source, pre-warming a heating device to achieve a substantially constant target temperature on an outer surface thereof;

upon stabilizing said target temperature, overheating said heating device to an overheat temperature higher than said target temperature;

turning off said source when the overheat temperature is attained; and initially engaging said heating device with a pressure device upon the source being turned off for performing a substantially immediate thermal transfer overcoat operation.

13. The method as set forth in claim 12, the pre-warming further comprising:

turning said source on and raising temperature at said outer surface to a predetermined value less than said target temperature;

pulsing said source on-and-off while raising said temperature at said outer surface from said predetermined value to approximately said target temperature.

14. The method as set forth in claim 12 wherein said overheating creates heat waves within said heating device such that accumulated heat is sufficient for maintaining said overcoat operation temperature for performing an entire said thermal transfer overcoat operation after the heat source is turned off.

15. A thermal transfer overcoat method comprising:

preheating a heating roller such that thermal waves subjacent the heating roller outer surface will maintain a substantially constant fusing temperature at said surface for a first predetermined period of time without additional heating of the roller during the period of time, wherein said period is anticipative of a heat sink formed during thermal transfer overcoat operations at a heating roller—pressure roller nip;

engaging said heating roller with a pressure roller to form the nip; and mating a document to an overcoating film ih the nip within said predetermined period of time.

16. The method as set forth in claim 15, said preheating comprising:

a first stage during which a constant heat is applied within said heating roller.

17. The method as set forth in claim 16 wherein said constant heat is applied until a predetermined temperature less than a predetermined target temperature is achieved at said surface.

18. The method as set forth in claim 16, said preheating comprising:

a second stage during which a pulsed heat is applied within said heating roller.

19. The method as set forth in claim 18 wherein said pulsed heat is applied until a target temperature is achieved at said surface.

20. The method as set forth in claim 19 wherein said target temperature at said surface is stable for a second predetermined period of time.

21. The method as set forth in claim 18, said preheating comprising:

a third stage wherein a constant heat is applied within said heating roller.

22. The method as set forth in claim 21 wherein said constant heat is applied until said surface is at a temperature greater than said fusing temperature by a predetermined amount.

* * * * *

UNITED STATES PATENT AND TRADEMARK OFFICE

CERTIFICATE OF CORRECTION

PATENT NO. : 6,797,086 B2

DATED : September 28, 2004

INVENTOR(S) : Miquel Boleda et al.

It is certified that error appears in the above-identified patent and that said Letters Patent is hereby corrected as shown below:

<u>Column 1,</u>
Line 19, delete “Tehnology” and insert therefor -- Technology --

<u>Column 3,</u>
Line 44, after “307.” do not begin a new paragraph

<u>Column 4,</u>
Line 65, after “thereafter” insert -- . --

<u>Column 8,</u>
Line 8, delete “ih” and insert therefor -- in --

Signed and Sealed this

Nineteenth Day of April, 2005

JON W. DUDAS

*Director of the United States Patent and Trademark Office*